Patented May 26, 1953

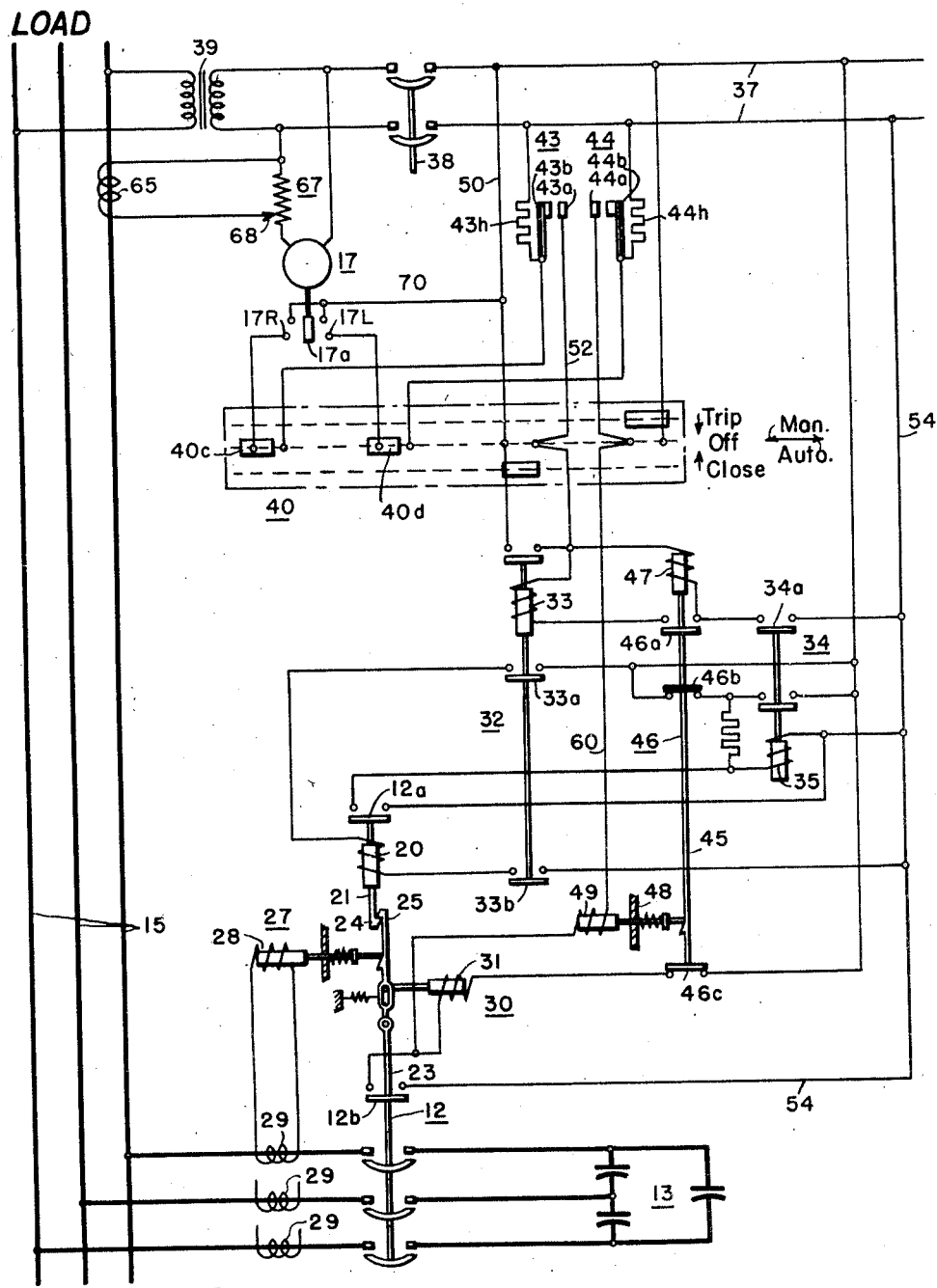

2,640,182

UNITED STATES PATENT OFFICE 2,640,182

AUTOMATIC SWITCHING SYSTEM

William H. Cuttino, Wilkinsburg, and Lester G. Tubbs, Pittsburgh, Pa., assignors to Westinghouse Electric Corporation, East Pittsburgh, Pa., a corporation of Pennsylvania Application September 29, 1949, Serial No. 118,686

5 Claims. (Cl. 323—106)

1

Our invention relates generally to automatic switching systems, and it has reference in particular to automatic switching systems such as may be used to control the connection of capacitors to power circuits.

Generally stated, it is an object of our invention to provide an automatic switching system which is simple and inexpensive to manufacture, and is reliable and effective in operation.

More specifically, it is an object of our invention to provide for controlling the switching of capacitors in a power system in accordance with both the voltage and current of the system.

Yet another object of our invention is to provide, in a capacitor switching system for a power circuit, for recalibrating a voltage control relay in accordance with the load current of the power circuit so as to provide for reducing the voltage level of the relay under increased load conditions.

It is also an object of our invention to provide, in a capacitor switching system for an electric circuit, for introducing a control voltage proportional to the load in the power circuit into the energizing circuit of a voltage relay which controls the switching of the capacitors.

Yet another object of our invention is to provide, in a capacitor switching system, for recalibrating a voltage responsive control relay directly in accordance with the load current of a power circuit to which the capacitors are to be connected.

Other objects will in part be obvious, and will in part be explained hereinafter.

In practicing our invention in one of its forms, a voltage relay responsive to the voltage of a power circuit is utilized to control the connection of a bank of capacitors to the power circuit. Operation of the voltage relay is modified by introducing into the energizing circuit thereof an opposing voltage which is proportional to the load current of the power circuit so as to provide for reducing the voltage level of the relay when the load on the system reaches a predetermined value.

For a more complete understanding of the nature and scope of our invention, reference may be made to the following detailed description, which may be read in connection with the accompanying drawing, in which the single figure is a diagrammatic view of an automatic capacitor switching system embodying the invention in one of its forms.

The invention has been illustrated as applied to a capacitor switching system which is substantially identical with that described in detail in the copending application of William H. Cuttino, Serial No. 788,898, filed on November 29, 1947, now Patent No. 2,611,009. The same numerals are utilized hereinafter to designate equipment similar to that shown in the drawing of said copending application. Additional apparatus or equipment is designated by numerals not appearing in said application.

Referring to the single figure of the drawing, it will be seen that a circuit breaker 12 may be utilized to connect a bank of capacitors 13 to a power circuit comprising conductors 15 under the control of a voltage relay 17 responsive to the voltage of the power circuit.

The circuit breaker 12 may be of any suitable type, being, for example, of the trip-free type comprising an operating winding 20 for actuating an armature 21, which may be connected to a breaker operating mechanism 23 by latch members 24 and 25. Overload trip means 27 having an operating winding 28 may be utilized to normally latch the breaker in the closed position. The trip winding 28 may be energized in accordance with the current of the capacitors 13, being, for example, energized from current transformers 29, only one of which is shown as connected in order to simplify the drawing.

Shunt trip means 30 having an operating winding 31 may be provided for actuating the mechanism 23 to disengage the latch members 24 and 25 and open the circuit breaker. Suitable closing means comprising a closing relay 32 having an operating winding 33, and a cutoff relay 34 having an operating winding 35 may be provided for closing the breaker.

The closing relay 32 may be disposed to connect the operating winding 20 of the breaker to a suitable source of electrical energy which may be represented by the control bus conductors 37. These conductors may be connected by means of a suitable switch device 38 and control transformer 39 to power circuit conductors 15.

The cutoff relay 34 may be connected so as to be normally energized, and be shunted down through contact members 12a of the circuit breaker so as to interrupt the energizing circuit for the closing relay 32 when the breaker closes.

A manual control switch 40 may be provided for manually tripping and closing the breaker, said switch being operable to an automatic position for connecting the breaker for automatic operation.

Automatic operation of the breaker may be effected by connecting the closing relay 32 and the shunt trip means 30 for energization under the control of the voltage relay 17 which may be connected for energization to the control bus conductors 37 to be energized in accordance with the voltage of the conductors 15 of the power system.

The time delay relays 43 and 44, which are illustrated as being of the bimetallic type, may be connected in circuit relation with the closing relay 32 and the shunt trip means 30 by the voltage relay 17 so as to provide for delayed closing and opening of the circuit breaker as the voltage of the power circuit falls and rises predetermined amounts, respectively.

In order to provide for normally reclosing the circuit breaker 12 when it is connected for automatic operation and for preventing reclosure of the circuit breaker when it is tripped by the overload trip means 27, a lockout relay 46 may be provided having an armature 45 with an operating winding 47 and a mechanical latch 48 for retaining the armature in the operated position. A reset winding 49 may be provided for releasing the latch 48 to return the relay to the reset or non-operated position.

By connecting the normally open contact member 46a of the lockout relay 46 in circuit relation with the operating winding 33 of the closing relay 32 and connecting the normally closed contact member 46b of the lockout relay to provide a closing circuit for the cutoff relay 34, reclosing of the circuit breaker may be prevented under the prescribed conditions. A normally closed contact member 46c of the lockout relay may be utilized to energize the operating winding 31 of the shunt trip means 30 when the lockout relay is operated to the reset position, so as to trip the breaker.

In order to provide for modifying the operation of the voltage relay 17 so as to automatically switch the capacitors 13 in response to a combination of line voltage and load current, a current transformer 65 may be utilized in connection with the conductors 15 of the power circuit to produce a voltage proportional to the load current of the power circuit. This voltage may be introduced in circuit relation with the voltage relay and the conductors 37 by means of a voltage divider 67 having its terminals connected in series circuit relation with the voltage relay 17 and the conductors 37.

The current transformer 65 may be connected on the load side of the capacitors 13 to apply a current responsive voltage between an adjustable tap 68 from the voltage divider and one terminal of the divider. This voltage may be connected in opposed relation to the voltage from the control transformer 39 so as to reduce the voltage level of the relay 17 relative to the voltage of the power conductors 15.

With the control switch 40 operated to the automatic position, the contact members 40c and 40d will be moved to the right so as to set up energizing circuits for the time delay relays 43 and 44 in accordance with operation of the voltage relay 17. Should the voltage relay be located in intermediate position such as shown, an increase of load on the power system results in an increased voltage being applied by the current transformer 65 to the voltage divider 67. Since this voltage is in opposition to the voltage from the control transformer 39, it reduces the effective voltage applied to the voltage relay 17. The armature 17a of the voltage relay moves to the left to engage stationary contact members 17R.

This completes an energizing circuit for the heater 43h of the time delay relay 43 through contact member 40c of the manual control switch 40.

After a predetermined time delay, contact members 43a and 43b of relay 43 engage and an energizing circuit is provided for the operating winding 47 of the lockout relay 46 extending from the upper control conductor 37 through conductors 50 and 70, contact members 17R and armature 17a, contact member 40c, contact members 43b and 43a, conductor 52, operating winding 47, contact member 34a of the cut-off relay 34 which operates whenever the conductors 37 are energized and conductor 54 to the lower conductor 37. The lockout relay 46 operates, completing an energizing circuit for the operating winding 33 of the closing relay 32 through contact member 46a. The closing relay completes an obvious energizing circuit for the operating winding 29 of the breaker 12 through contact members 33a and 33b. Upon closing, the breaker completes a shunting circuit through contact member 12a which shunts down the cutoff relay 34, which thereupon deenergizes the operating windings 47 and 33 of the lockout relay 46 and closing relay 32, respectively.

Should the voltage of the power system conductors rise or should the load on the power system fall, the effective voltage applied to the voltage relay 17 will be increased. Accordingly the armature 17a moves counter-clockwise to engage the right-hand contact members 17L and disengage the left-hand contact members 17R. This provides an energizing circuit for the heater 44h of the relay 44 through contact members 40d of the manual control switch 40. After a predetermined interval of time the relay 44 operates and provides an energizing circuit for the reset winding 49 of the lockout relay 46 extending through contact members 17L, contact member 40d, contact members 44b and 44a, conductor 60, reset winding 49, contact members 12b of the circuit breaker 12 and conductor 54 back to the other control conductor 37.

The latch member 48 is thereupon actuated to release the lockout relay 46 which returns to the non-operated position as shown. An obvious operating circuit is thereupon provided for the cutoff relay 34, extending through contact members 46b of the lockout relay. At the same time an energizing circuit is provided through contact members 46c for energizing the operating winding 31 of the shunt trip means 30 to open the circuit breaker.

From the above description and the accompanying drawing, it will be apparent that we have provided, in a simple and effective manner, for automatically switching capacitors on a power system in response to a combination of line voltage and load current. The control relay which is normally responsive to the voltage of the power circuit, is recalibrated directly in accordance with the load on the circuit so as to provide for efficiently switching the capacitors to compensate for varying load conditions. This provides for switching the capacitors so as to maintain the voltage level higher under heavy load condition than during light load conditions, so as to more efficiently utilize the kilovars of the capacitor bank.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

We claim as our invention:

1. In combination with switch means operable to effect connection of capacitor means to an electric circuit, a voltage relay having an operating winding connected to be energized in accordance with a voltage from the electric circuit, and circuit means connected to introduce in circuit relation with said operating winding a voltage directly proportional to a load on said electric circuit and opposing the voltage of the circuit.

2. In a switching system for a capacitor, a switch device operable to connect the capacitor to an electric circuit connecting a load to a source, relay means connected to be energized in accordance with the voltage of the electric circuit, and circuit means including a fixed impedance device connected in circuit relation with said relay means and associated with the electric circuit on the load side of the capacitor to introduce an adjustable voltage in circuit relation with the relay means which is directly proportional to the current of said electric circuit.

3. The combination in a switching system for a capacitor, of switch means operable to connect the capacitor to an electric circuit connecting a load to a source, a voltage relay connected to effect operation of the switch means, a current transformer connected in circuit relation with the electric circuit on the load side of the capacitor, and a voltage divider connected in circuit relation with the voltage relay and having an adjustable connection in circuit relation with the current transformer for modifying the operation of the voltage relay directly in proportion to the load current.

4. In a switching system for a capacitor having switch means operable to connect it to an electric circuit connecting a load and a source, a voltage relay operable to effect operation of the switch means, a potential transformer connected to the electric circuit to apply an operating voltage to the voltage relay, a voltage divider having end terminals connected in circuit relation with the voltage relay and potential transformer, said voltage divider having an adjustable tap, and a current transformer connected in circuit relation with the electric circuit on the load side of the capacitor to apply a voltage between the center tap and one end of the voltage divider and recalibrate the voltage relay directly in accordance with the load.

5. In a switching system for a capacitor having switch means operable to connect the capacitor to an electric circuit connecting a load and a source, a voltage relay operable to control the operation of the switch means in accordance with the voltage of the circuit, and circuit means connected to apply voltage to the voltage relay which opposes the voltage of the circuit, to thereby recalibrate the voltage relay directly in accordance with the load current in the circuit.

WILLIAM H. CUTTINO.
LESTER G. TUBBS.

References Cited in the file of this patent

UNITED STATES PATENTS

| Number | Name | Date |
|---|---|---|
| 1,780,676 | Hough | Nov. 4, 1930 |
| 2,046,990 | Woodrow | July 7, 1936 |
| 2,388,639 | Marbury | Nov. 6, 1945 |
| 2,404,643 | Livingston | July 23, 1946 |
| 2,484,575 | Livingston | Oct. 11, 1949 |
| 2,488,399 | Harder | Nov. 15, 1949 |